United States Patent Office 3,451,767
Patented June 24, 1969

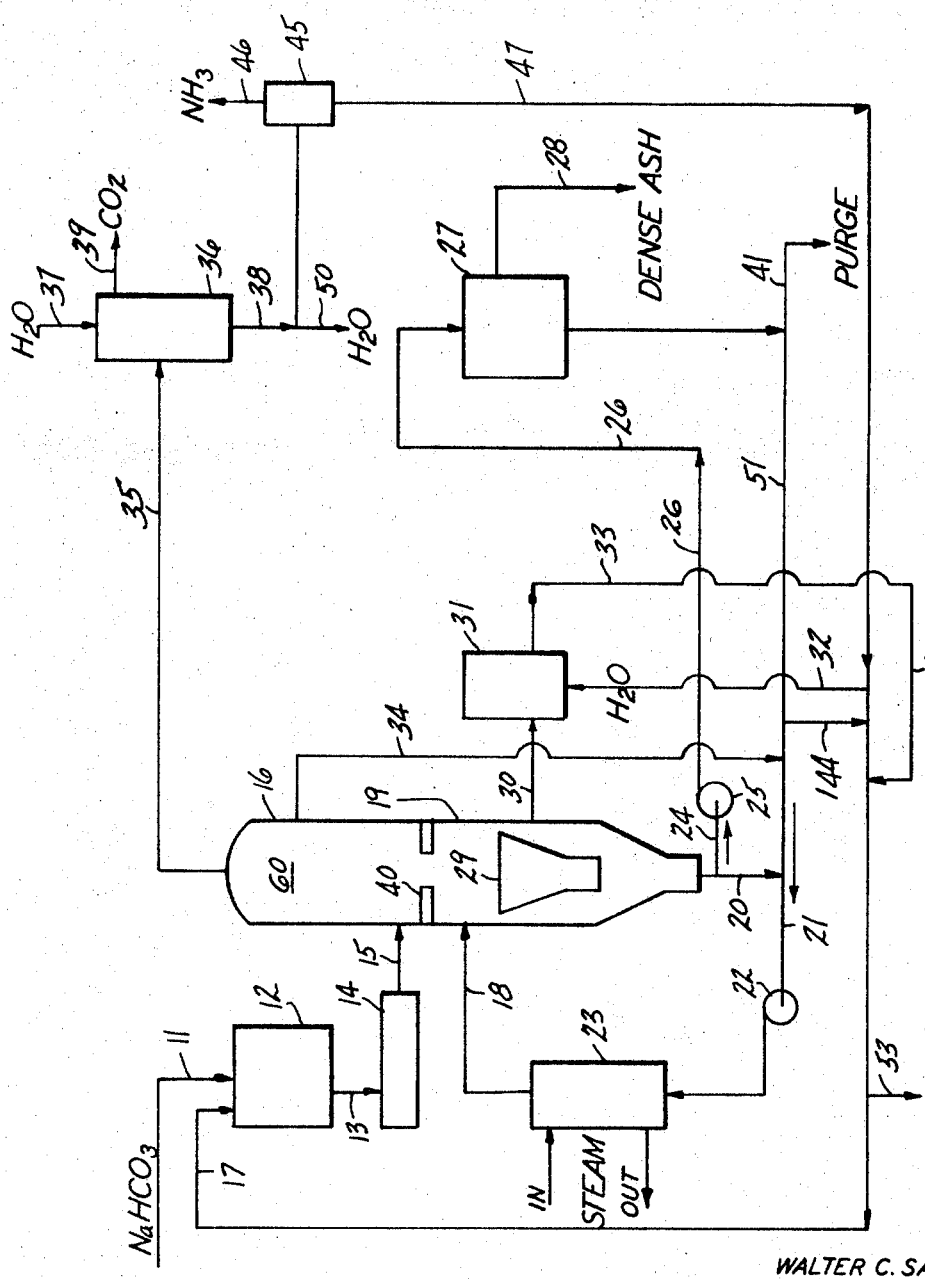

3,451,767
PROCESS OF PREPARING ANHYDROUS SODIUM CARBONATE FROM CRUDE SODIUM BICARBONATE
Walter C. Saeman, Orange, and Judson A. Wood, North Haven, Conn., assignors to Olin Mathieson Chemical Corporation
Filed May 19, 1966, Ser. No. 551,334
Int. Cl. C01d 7/12
U.S. Cl. 23—63                                                       16 Claims

ABSTRACT OF THE DISCLOSURE

Crude sodium bicarbonate is mixed with a recycle aqueous stream containing suspended crystals of anhydrous sodium carbonate at 120° to 250° C. and at 60 to 300 p.s.i.a. to produce decomposition gases and to enrich the recycle stream in suspended crystals of anhydrous sodium carbonate. Anhydrous sodium carbonate crystals are separated and the recycle stream is regenerated.

Figure 1:
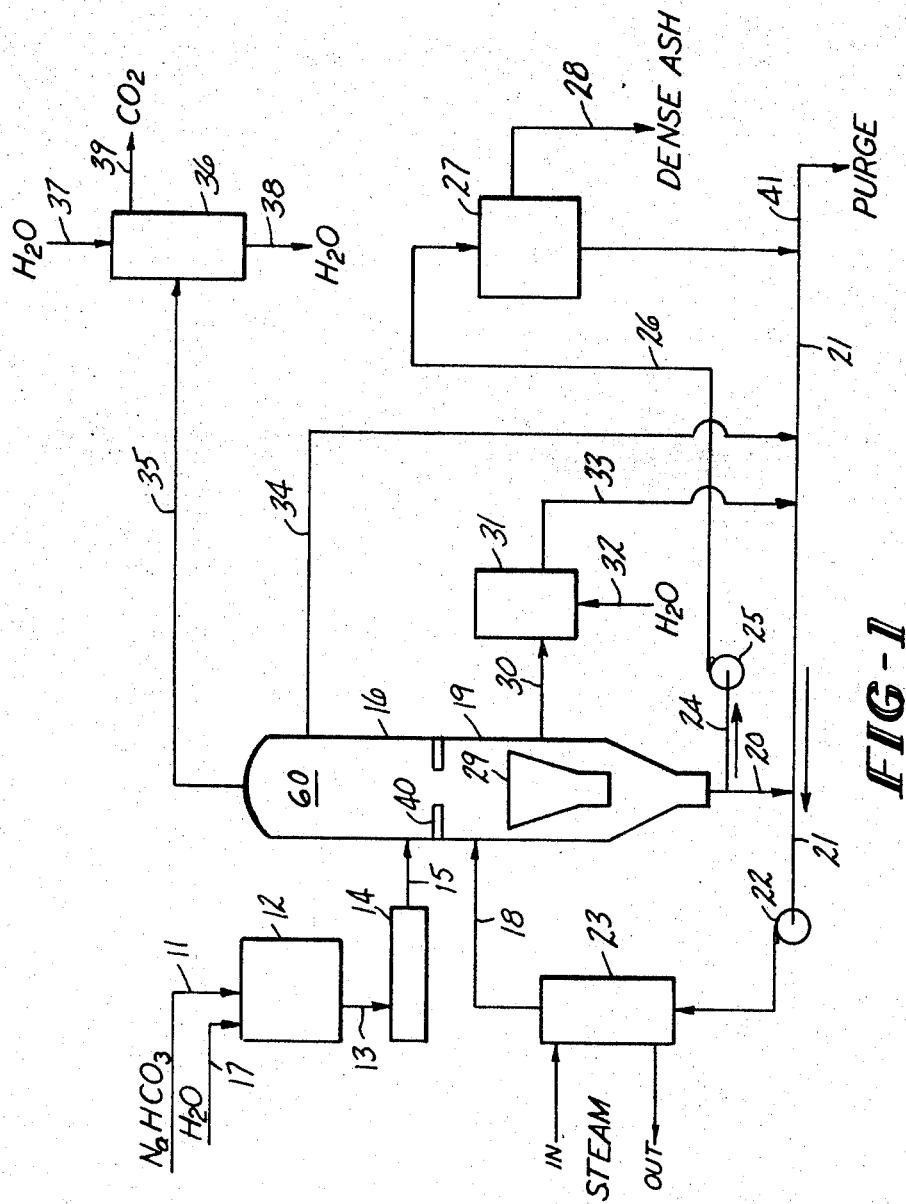

This invention relates to an improved method for producing dense soda ash from sodium bicarbonate. More particularly, the improved method contemplates forming anhydrous soda ash in the presence of preformed seed crystals of anhydrous sodium carbonate.

Crude sodium bicarbonate, produced in the ammonia-soda process usually contains minor amounts of sodium chloride and ammonium bicarbonate. On calcining at atmospheric pressure, ammonia, carbon dioxide and water are driven off leaving dry anhydrous material called "light soda ash" having a density of about 30 #/cu. ft. For many purposes, particularly glass making, a more dense ash is required and greater purity is desired. Dense ash of about 60 #/cu. ft. is produced from the light ash by several methods, one of which is pugging with sufficient water to form the monohydrate and calcining the monohydrate. It is also known to produce dense ash by crystallizing sodium carbonate from water at temperatures above about 107° C. which is the transition point of the monohydrate to anhydrous sodium carbonate.

U.S. Patent 1,907,987 shows crystallization of $Na_2CO_3$ from aqueous solution at 3 to 10 p.s.i.g. and 110 to 120° C. This is above the transition temperature of sodium carbonate monohydrate to anyhdrous sodium carbonate. No preformed anhydrous sodium carbonate seed is present and there is no control of particle size.

U.S. Patent 2,133,455 discloses dissolving sodium bicarbonate in a solution of sodium carbonate and heating under pressure at a temperature above the transition point of sodium carbonate monohydrate to anhydrous sodium carbonate to form a slurry containing anhydrous sodium carbonate as a solid phase, flashing to atmospheric pressure, separating anhydrous sodium carbonate from the mother liquor and recycling the mother liquor. The decomposition occurs in the absence of preformed anhydrous sodium carbonate seed and without control of product size.

U.S. Patent 2,267,136 discloses a process for the production of dense soda ash wherein an aqueous slurry of sodium bicarbonate is heated to decompose the bicarbonate and to form a solution of sodium carbonate containing undecomposed sodium bicarbonate. Anyhdrous sodium carbonate is crystallized from said solution. The decomposition occurs in the absence of preformed anhydrous sodium carbonate seed and without control of product size.

U.S. Patent 3,113,834 shows mixing crude sodium bicarbonate with a recycle mother liquor, decomposing the sodium bicarbonate in the liquor at 150° to 250° C. and at 80 to 500 p.s.i.a. to form water, carbon dioxide and anhydrous sodium carbonate. Decomposition occurs in the absence of preformed anhydrous sodium carbonate seed and no control of product size is shown.

One object of this invention is to provide an improved process for converting crude ammonia soda in one operation into high density soda ash.

Another object of this invention is to provide purified high density soda ash.

A further object of this invention is to provide a process to which wet or dry crude sodium bicarbonate is suitably charged.

A still further object of this invention is to provide a process which produces by-product carbon dioxide at a pressure suitable for direct re-use in an ammonia soda process without recompressing.

Another object of this invention is to provide a product of uniform mesh size free from fines and dust.

A further object of this invention is to provide an improved process in which the required heat is introduced at only one point avoiding any other heat exchangers and thereby avoiding scaling and leakage problems associated therewith.

The process of this invention is cyclic method of producing dense soda ash which comprises mixing crude sodium bicarbonate with a recycle stream containing suspended anhydrous sodium carbonate seed crystals at a temperature from about 120° to 250° C. and at a pressure from about 60 p.s.i.a. to about 300 p.s.i.a. to produce decomposition gases and a stream enriched in anhydrous sodium carbonate crystals, separating said decomposition gases and separating anhydrous sodium carbonate crystals to produce said recycle stream.

In the prior art, so far as known, the decomposition of sodium bicarbonate to form anhydrous dense sodium carbonate directly has been carried out in the absence of seed crystals of sodium carbonate on which the newly formed sodium carbonate can grow. Even recycle liquors, when used as a medium for decomposition of fresh sodium bicarbonate have previously been obtained from filtration or other separation processes whereby preformed sodium carbonate crystals which might serve as seed have been removed. This results in over-nucleation during bicarbonate decomposition and the production of excessive proportions of fines resulting in a dusty product. Products containing excessive amounts of fines also contain higher proportions of impurities from the liquor in which they are formed than occur in products grown in the presence of seed to form larger crystals. Uniformity of size is a minimum in products formed in the absence of seed and this necessitates sorting, a difficult operation with so hygroscopic a product as anhydrous soda ash. Excessive recycle of fines and crushing of oversize is a further consequence of the absence of seed.

Among the principal features of the process of this invention are the production of dustless, high density anhydrous soda ash of exceptional purity having uniform grain size in the range of glass sand. The density is in the range of 70 to 90 #/cu. ft. Chloride and ammonia are negligible. Other features of the process of this invention reside in improved operations. Wet or dry crude sodium bicarbonate is suitably charged to the process of this invention, only one heat exchanger is required, advantageously relying on direct heat exchange to conserve heat. Scaling is thus substantially reduced. Excess vaporization of water is avoided to conserve the heat required for decomposition. A further advantage of the process of this invention is operation under pressures permitting the recovery of carbon dioxide resulting from the decomposition under pressures suitable for direct return to an ammonia soda plant without recompression.

Figure 2:
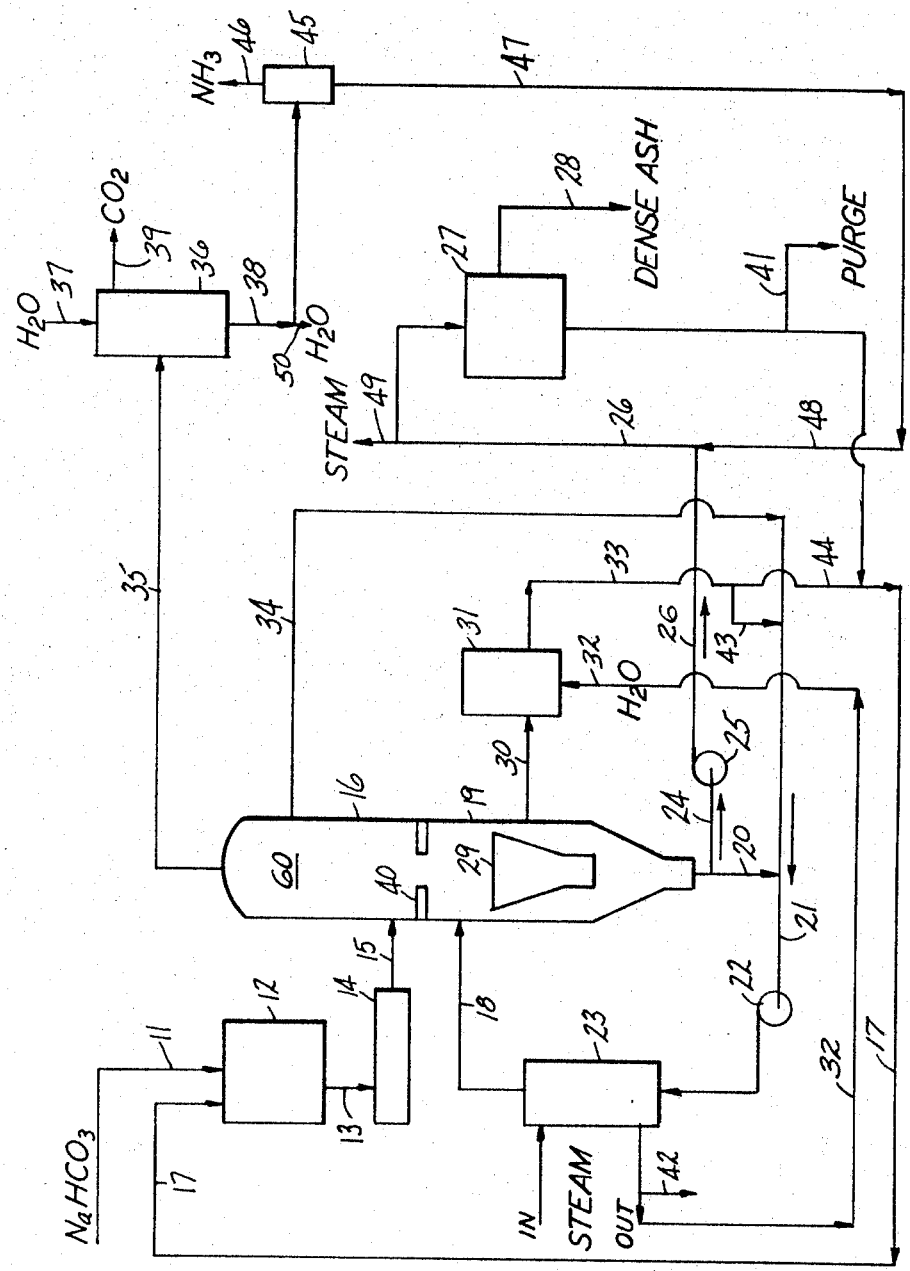

The process of this invention is illustrated by the accompanying drawings. FIGURE 1 is a flow sheet showing a simplified form of the invention. FIGURES 2 and 3 show variations of the process of the invention. In FIGURE 1, a slurry of anhydrous soda ash crystals is introduced via line 18 into a classifier section 19 of crystallizer 60. A portion of the slurry passes into economizer section 16 and passes baffle 40. Baffle 40 serves to minimize inter-mixing and to control the flow of slurry into economizer section 16. Damp sodium bicarbonate feed is introduced via line 11 into feed tank 12 from which it is removed via line 13 and screw conveyor 14 and transferred via line 15 to a feed zone in economizer section 16. In an alternative mode of operation, water is introduced via line 17 into tank 12. A slurry of sodium bicarbonate is formed and introduced via lines 13 and 15 into economizer section 16. In this alternative method screw conveyor 14 is suitably replaced by a slurry pump. Decomposition gases formed in economizer section 16 are removed via line 35 to the carbon dioxide recovery system and the slurry, enriched in anhydrous sodium carbonate crystals is returned via line 34 to common recycle line 21. Decomposition gases are scrubbed in quench tower 36 using cold water introduced via line 37 and removed via line 38. Scrubbed, cooled carbon dioxide gas is removed via line 39.

The remaining portion of the slurry of anhydrous soda ash crystals in saturated solution is circulated from classifier section 19 via line 20, common recycle line 21 and pump 22 through heater 23 and via line 18 back to classifier section 19. A minor portion of slurry is diverted by means of pump 25 via lines 24 and 26 to a product separation zone or separator 27 which is suitably a filter or centrifuge. Dense ash product is removed from separator 27 via line 28 and the liquor is returned to common recycle line 21. Alternatively, heater 23 is suitably incorporated internally of crystallizer 60, appropriately in the lower portion thereof, effecting economies in construction and operation.

Within classifier section 19 is chimney 29 in which larger crystals settle to the bottom while an elutriation zone is created between the sides of chimney 29 and the walls of classifier section 19. From this vicinity a portion of the contents of classifier section 19 in which fines are the principal solid phase is removed via line 30 to fines dissolver 31. Water is introduced via line 32 and the resulting clear solution is recycled via line 33 to common recycle line 21. A purge line 41 is provided for use as necessary.

Numbered parts shown in FIGURES 2 and 3 having the same numbers as in FIGURE 1 correspond to identical parts.

FIGURE 2 shows a flow sheet illustrating alternative modes of operation. In one alternative, steam condensate is partly discharged via line 42 and partly transferred via line 32 to fines dissolver 31, thus utilizing the steam condensate for dissolving the fines.

The clear solution of fines is partly returned via lines 33 and 43 to common recycle line 21 and partly transferred via line 44 and line 17 into feed tank 12, utilizing added water to form the feed slurry of sodium bicarbonate.

In another alternative shown in FIGURE 2, decomposition water separated from carbon dioxide is partly discharged via line 50 and partly transferred via line 38 to stripper 45 removing small amounts of ammonia via line 46 and transferring the thus purified aqueous stream via lines 47 and 48 and mixed with the product slurry in line 26. The pressure is reduced to atmospheric by discharging steam via line 49 and the slurry is transferred to separator 27. The liquor from separator 27 is mixed with the solution in line 44.

In the variation illustrated in FIGURE 3, the purified aqueous stream is transferred via lines 47 and 32 partly to fines dissolver 31 and via lines 47 and 17 to feed tank 12, thus utilizing a portion of the decomposition water for dissolving the fines.

Line 144 carries back to line 17 and feed tank 12 part of the liquor in line 51 to which is added the solution from line 33. Pressure is let down to atmospheric by steam discharge via line 53. Line 21 returns to pump 22 part of the liquor from line 51 and slurry from lines 20 and 34.

In operation, circulation is established of a slurry of anhydrous sodium carbonate crystals in saturated aqueous solution by means of pump 22 through heater 23, line 18 and classifier section 19, returning via lines 20 and 21 to pump 22. Two heaters are suitably provided for continuous operation while one is out of service. Multiple heaters are appropriate for high heat input when desired. A pressure of about 105 p.s.i.a. and a temperature of 170° C. in line 18 are maintained. In the simplest mode of operation, a portion of the slurry of anhydrous soda ash crystals flows into economizer section 16 and sodium bicarbonate is fed via line 15 into the circulating slurry. Decomposition gases pass via line 35 to the carbon dioxide recovery system. The remaining portion of the slurry is recycled via lines 20 and 21 to heater 23. A minor portion is removed by pump 25 via lines 24 and 26 to filter 27. Dense ash is removed via line 28 and filtrate is recycled via line 21. Two filters are suitably provided for continuous operation while one filter is being dumped and readied for alternate use.

In a preferred mode of operation, slurry enriched in fines is removed from the quiescent elutriation zone of classifier section 19 via line 30 and transferred to fines dissolver 31. Water introduced via line 32 is just sufficient to dissolve suspended fines and convert the slurry to a solution which is returned via line 33 to common recycle line 21.

Other modes of operation illustrated in FIGURES 2 and 3 and described above are particularly advantageous in conserving water and heat in the process. Steam condensate and water of decomposition are available at elevated temperatures under superatmospheric pressure for use in dissolving fines and in forming the feed slurry as an alternative to feeding solid sodium bicarbonate. As an alternative to separation of the product, for example by centrifuging or filtration under pressure water, particularly recovered water of decomposition is advantageously mixed with the product slurry, blown down to atmospheric pressure and filtered or otherwise separated before the anhydrous ash can hydrate to monohydrate. The time delay in this reaction is sufficient to permit such operation The operation illustrated in FIGURE 3 utilizes water of decomposition for dissolving fines and for forming the feed slurry.

The recited pressures and temperatures are substantially maintained by suitable circulation throughout the system, including particularly the heater circuit, the fines dissolving circuit and the product separation circuit. This insures separation of anhydrous ash as product either above its transition temperature to monohydrate or prior to transition to monohydrate. The pressure in the carbon dioxide scrubber is not necessarily maintained at the same operating pressures as in the heater circuit but it is advantageous to maintain the pressure in the scrubber above about 50 p.s.i.a. The carbon dioxide is then suitable for charging to the ammonia soda plant without recompression.

In the preferred operation, crude sodium bicarbonate is fed into a portion of the circulating slurry containing seed crystals of controlled size and amount under pressures of 60 to 300 p.s.i.a. at temperatures from 120° to 250° C. and preferably at 140° to 200° C. in the heat economizer zone. A portion of the circulating slurry passes through the size classification zone and into the heater circuit. The flow through the heater circuit is adjusted to optimize heat transfer and to minimize heater scaling. Decomposition gases are removed through the economizer zone. From the economizer zone, the slurry, enriched in anhydrous sodium carbonate crystals, is returned to the heater circuit.

When larger crystal size is desired, the flow of slurry having a high proportion of fines from the elutriation zone of the classifier is increased. This removes excess nuclei from the suspension of crystals in the system. If smaller crystals are desired, the flow of slurry from the elutriation zone is decreased or stopped. Nucleation can also be increased mechanically by an attrition device installed in the system.

The composition range of the solution in equilibrium with the anhydrous sodium carbonate is quite narrow under the most economical conditions of operation of the process. For this reason, the product in one mode of operation is separated from the slurry without appreciable temperature change of the liquid phase. The product removal circuit has a solids separating stage, for example, a filter, centrifuge, or settling chamber. The effluent from the solids separating stage forms a recycle stream which is returned to the reactor without substantial temperature change. This avoids the separation of other solid phases which would be undesirable in the production of anhydrous soda ash.

Heat required in the process is furnished only in heater 23, minimizing scaling problems and avoiding indirect heat exchangers elsewhere in the system. Direct heat exchange, particularly between decomposition gases and slurry in the economizer is especially efficient. Heat is required in the process for:

(a) Preheating crude sodium bicarbonate;
(b) Dissolving crude sodium bicarbonate;
(c) Decomposing ammonium bicarbonate;
(d) Decomposing sodium bicarbonate;
(e) Crystallizing anhydrous sodium carbonate;
(f) Supplying heat losses from the equipment; and
(g) Evaporating excess water.

The first five of these items are incapable of appreciable variation. Items (f) and (g) are controlled by effective insulation and by controlling the water balance in the system. Water input consists of:

(1) Water generated by decomposition of sodium bicarbonate;
(2) Moisture in the feed;
(3) Wash water, if any; and
(4) Water for redissolving excess fines.

Water output consists of:

(5) Water content of product;
(6) Water exhausted with purged recycle; and
(7) Water vaporized with the exhausted $CO_2$.

Input water is advantageously minimized and output water is balanced to remove input water. Some flexibility is provided in controlling the rate of water removal by each of items (5), (6) and (7). However, purge rates are preferably minimized in order to maintain productivity. Item (5) is also preferably minimized.

Initially, the ratio of $H_2O/CO_2$ discharged from the system is dependent on the concentrations of sodium bicarbonate and sodium carbonate contained in the liquid phase, the temperature of the solution and the rate of vapor formation. If the vapor were immediately separated from the solution, the only means for varying the $H_2O/CO_2$ ratio to maintain the water balance at the minimum rate of water introduction is to vary the temperature of the system since the concentrations of the $NaHCO_3$ and $Na_2CO_3$ correspond to those of saturated solutions. Under these conditions, the minimum water balance can be maintained only at temperatures of 200° C. and higher and at pressures of 300 p.s.i.g. and higher.

However, it is a surprising feature of the process of the present invention that additional control of the water balance of the process is provided whereby the minimum water balance is satisfied at substantially lower temperatures and pressures.

The heat requirements of the system, enumerated (a) to (g) above are all positive, requiring introduction of heat to the system. Heat is removed with decomposition gases in the economizer section, lowering the temperature of the slurry. This heat is supplied in the heater circuit of the system. The vapor pressure of water from sodium carbonate solutions proportionately decreases as the temperature decreases but the decrease in partial pressure of $CO_2$ is less. Thus, in the economizer zone, the partial pressure of water vapor is reduced independently of the $CO_2$ partial pressure. The $H_2O/CO_2$ ratio is thus variable in the economizer in addition to the variation due to changes in the operating temperature in the heater circuit and the concentrations of the $NaHCO_3$ and $NaCO_3$. The economizer zone therefore affords control of the minimum water balance at substantially lower temperatures and pressures than would be required without this feature and thereby creates additional operating economies for the system. The economizer provides time for heat transfer from the liquid to the decomposition gases. Concurrent flow of the gases and liquid reduces any tendency for inter-mixing of compositions from different positions in the economizer and tends to increase the temperature differential at the liquid outlet. Controlling the flow rate through the economizer provides the required temperature differential which, in turn, provides the required $H_2O/CO_2$ ratio to maintain the water balance of the system. This ratio is suitably less than 7.5:1 and preferably less than 5.5:1.

It is a further advantage of the process of this invention that the simultaneous decomposition of the $NaHCO_3$ and the crystallization of anhydrous sodium carbonate occur at maximum growth rates. The generation of intermediate double salts of $NaHCO_3$ and $Na_2CO_3$ is avoided. This permits the use of simpler and more compact equipment less subject to scaling. The concurrent flow through the economizer of a heavy suspension of $Na_2CO_3$ seed, the decomposition gases and the feed is one of the features which permits the surprisingly simple production of the particularly desirable form of soda ash obtained using the process of this inveniton. The suspension of seed is so massive in relation to the new feed injected that the relative variation in the concentration of $NaHCO_3$ through the zone is small. The massive suspension is 5 to 40% by weight solids. The flow of recycle is 1 to 100 times that of the weight of the feed, preferably about 5 to 50 times.

Example I

Ammonia soda (crude $NaHCO_3$ containing $NH_4HCO_3$) was decomposed in a system substantially as shown in FIGURE 1. The feed rate was 100 lb./hr. of $NaHCO_3$. The amomnia soda was slurried with water in a ratio of 60 parts $NaHCO_3$ to 40 parts water to form a pumpable mixture for injection into the reactor operating at 90 p.s.i.g. (105 p.s.i.a.). The heater outlet temperature was 176° C. The steam requirement for maintaining the heater outlet temperature at 176° C. was 50 lb./hr. with no ammonia soda feed. The total steam requirement for decomposing the ammonia soda at the 100 lb./hr. $NaHCO_3$ feed rate was 170 lb./hr., calculated as follows:

| | Steam lb./hr. |
|---|---|
| (a) Preheating ammonia soda and water to 176° C. | 15 |
| (b) Dissolving ammonia soda | 10 |
| (c) Decomposing ammonium bicarbonate | 2 |
| (d) Decomposing sodium bicarbonate | 6 |
| (e) Crystallizing sodium bicarbonate | 10 |
| (f) Heat losses from equipment | 50 |
| (g) Evaporation of water | 77 |
| Total | 170 |

The liquid effluent from the top of the economizer was 173° C. or 3° C. below the heater outlet temperature. This provided a molar ratio of $H_2O/CO_2$ leaving the reactor of 7:1 and this maintained the water balance of the system.

The recycle liquor was pumped through the heaters at a rate varying between 5100 and 13,000 lb./hr. to provide the required heat in the system. The rate was adjusted to maintain a steady liquid level in the economizer. Liquor was removed from the elutriation zone of the crystallizer at a rate of 500 lb./hr., water sufficient to dissolve the fines in this liquor was added and the solution was returned to the recycle line. This reduced the proportion of crystal nuclei in the main recycle stream and provided about 2 to 4 pounds of seed per gallon of liquor in the economizer. The stream of liquor diverted from the bottom of the crystallizer zone was 250 lb./hr. and the particle size of the anhydrous ash removed in the filters was thus maintained at about 40 mesh.

The pressure in the filters was 90 p.s.i.g. and the temperature was from 170 to 176° C. The production rate was 63 lb./hr. of anhydrous soda ash and steam usage was 170/63=2.7 lb./lb. of $Na_2CO_3$.

Analysis: $Na_2CO_3$ 99.2% NaCl 0.03% Mesh analysis

| Mesh size: | Cumulative percent |
|---|---|
| +30 | 10.0 |
| +40 | 40.2 |
| +50 | 80.1 |
| +70 | 95.3 |
| +100 | 98.6 |
| +200 | 100 |

When fines were not removed from the elutriation zone and redissolved, the typical size of product recovered was:

| Mesh size: | Cumulative percent |
|---|---|
| +30 | — |
| +40 | 4.6 |
| +50 | 25.9 |
| +70 | 60.9 |
| +100 | 86.3 |
| +200 | 99.9 |

Example II

Crude ammonia soda was decomposed in a system substantially as shown in FIGURE 1. The feed rate was 100 lb./hr. of $NaHCO_3$. The ammonia soda was injected into the reactor operating at 90 p.s.i.g. (105 p.s.i.a.) and 176° C. as a damp solid containing 15 parts of water per 100 parts of $NaHCO_3$. Steam requirements for maintaining the heater outlet temperature at 176° C. and for decomposing the ammonia soda was 115 lb./hr., calculated as follows:

| | Steam lb./hr. |
|---|---|
| (a) Preheating ammonia soda and water to 176° C. | 12 |
| (b) Dissolving ammonia soda | 10 |
| (c) Decomposing ammonium bicarbonate | 2 |
| (d) Decomposing sodium bicarbonate | 6 |
| (e) Crystallizing sodium bicarbonate | 10 |
| (f) Heat losses from equipment | 50 |
| (g) Evaporation of water | 15 |
| Total | 115 |

The liquid effluent from the top of the economizer was 165° C. or 11° C. below the heater outlet temperature. This provided a molar ratio of $H_2O/CO_2$ leaving the reactor of 2.3/1 and this maintained the water balance of the system.

The recycle liquor rate through the economizer was controlled to maintain a steady liquid level in the economizer at a steady feed rate of 100 lb./hr. of crude bicarbonate. The recycle rate to maintain a steady liquid level in the economizer was 1500 lb./hr. Liquor was removed from the elutriation zone of the crystallizer at a rate of 500 lb./hr., water sufficient to dissolve the fines in this liquor was added and the stream was returned to the recycle line. This reduced the proportion of crystal nuclei in the main recycle stream and provided about 2 to 4 pounds of seed per gallon of liquor in the economizer. The stream of liquor diverted from the bottom of the crystallizer zone was 250 lb./hr. and the particle size of the anhydrous ash removed in the filters was thus maintained at about 30 mesh.

The pressure in the filters was from 90 p.s.i.g. and the temperature was from 170 to 173° C. The production rate was 63 lb./hr. of anhydrous soda ash and steam usage was 115/63=1.8 lb./lb. $Na_2CO_3$.

What is claimed is:

1. A cyclic method of producing dense soda ash which comprises:
    (a) producing, as hereinafter specified, a recycle aqueous stream containing suspended crystals of anhydrous sodium carbonate at a temperature from about 120° to 250° C. and at a pressure from about 60 to 300 p.s.i.a.;
    (b) mixing crude sodium bicarbonate in feed zone with at least a portion of said recycle stream to produce decomposition gases and to enrich said recycle stream in suspended crystals of anhydrous sodium carbonate and separting said decomposition gases;
    (c) separating anhydrous sodium carbonate crystals in a product separation zone from at least a portion of said recycle stream to produce product anhydrous sodium carbonate crystals and said recycle stream.

2. The method of claim 1 in which the suspended crystals in said recycle stream are maintained at about 5 to 40% by weight solids.

3. The method of claim 1 in which the temperature is maintained at about 140° to 200° C.

4. The method of claim 1 in which a portion of said recycle stream is by-passed around said feed zone and said product separation zone.

5. The method of claim 1 in which product anhydrous sodium carbonate crystals are separated at a temperature above 107° C.

6. The method of claim 1 in which said major portion of said recycle stream is classified and a fines stream is removed thereby enriching said recycle stream in coarse crystals of anhydrous sodium carbonate.

7. The method of claim 6 in which said fines stream is combined with water sufficient to dissolve suspended fines and to form a diluted fines stream and combining said diluted fines stream with said recycle stream.

8. The method of claim 7 in which said recycle stream is heated by indirect heat exchange with steam under pressure and the said water to dissolve suspended fines is steam condensate from said indirect heat exchange.

9. The method of claim 7 in which the ratio of water to fines is proportioned to produce an unsaturated solution of sodium carbonate at atmospheric pressure, reducing the thus diluted fines stream to atmospheric pressure and mixing it with crude sodium bicarbonate to form a slurry of sodium bicarbonate and mixing said slurry with said recycle stream.

10. The method of claim 7 in which said water to dissolve suspended fines is a purified aqueous stream produced by scrubbing said separated decomposition gases with liquid water at a pressure of from about 50 p.s.i.a. to about 300 p.s.i.a. to produce purified carbon dioxide at said pressure and an aqueous stream containing impurities including ammonia and stripping ammonia from said aqueous stream to produce said purified aqueous stream.

11. The method of claim 7 in which said diluted fines stream is mixed with a portion of said recycle stream from said product separation zone; reducing the pressure on said admixed diluted fines stream to atmospheric pressure; mixing the said admixed diluted fines stream with sodium bicarbonate to form a slurry and mixing said slurry with said recycle stream.

12. The method of claim 7 in which the molar ratio of the total water introduced into the process to the carbon dioxide in the decomposition gases removed from the process is less than 7.5:1.

13. The method of claim 12 in which said ratio is less than 5.5:1.

14. The method of claim 7 in which the portion of said recycle stream in said product separation zone is mixed with water, reduced to atmospheric pressure, precipitated anhydrous sodium carbonate is separated from the resulting liquor prior to hydration to form sodium carbonate monohydrate and the resulting liquor is returned to said solution of fines.

15. The method of claim 14 in which said water mixed with the portion of said recycle stream in said product removal zone is a purified aqueous stream produced by scrubbing said separated decomposition gases with liquid water at a pressure of from about 50 p.s.i.a. to about 300 p.s.i.a. to produce purified carbon dioxide at said pressure and an aqueous stream containing impurities including ammonia and stripping ammonia from said aqueous stream to produce said purified aqueous stream.

16. The method of claim 14 in which said water mixed with the portion of said recycle stream in said product separation zone is an aqueous stream produced by classifying said recycle stream, removing a fines stream and combining said fines stream with water sufficient to dissolve suspended fines to produce said aqueous stream.

References Cited

UNITED STATES PATENTS

| | | | |
|---|---|---|---|
| 2,294,788 | 9/1942 | Houghton | 23—63 X |
| 2,459,414 | 1/1949 | Carrier | 23—63 |
| 3,361,540 | 1/1968 | Peverly et al. | 23—63 X |

OSCAR R. VERTIZ, *Primary Examiner.*

G. T. OZAKI, *Assistant Examiner.*

U.S. Cl. X.R.

23—64

PO-1050
(5/69)

UNITED STATES PATENT OFFICE
CERTIFICATE OF CORRECTION

Patent No. 3,451,767          Dated June 24, 1969

Inventor(s) Walter C. Saeman and Judson A. Wood

It is certified that error appears in the above-identified patent and that said Letters Patent are hereby corrected as shown below:

Column 6, line 71, "bicarbonate" should read --carbonate--.

Column 7, line 61, "bicarbonate" should read --carbonate--; line 63, "15" should read --25--.

Column 10, line 13, "2,294,788" should read --2,294,778--.

SIGNED AND
SEALED

NOV 4 1969

(SEAL)
Attest:

Edward M. Fletcher, Jr.
Attesting Officer

WILLIAM E. SCHUYLER, JR.
Commissioner of Patents